June 24, 1941.  H. T. DOW  2,246,879
VEHICLE SPRING
Filed July 1, 1939
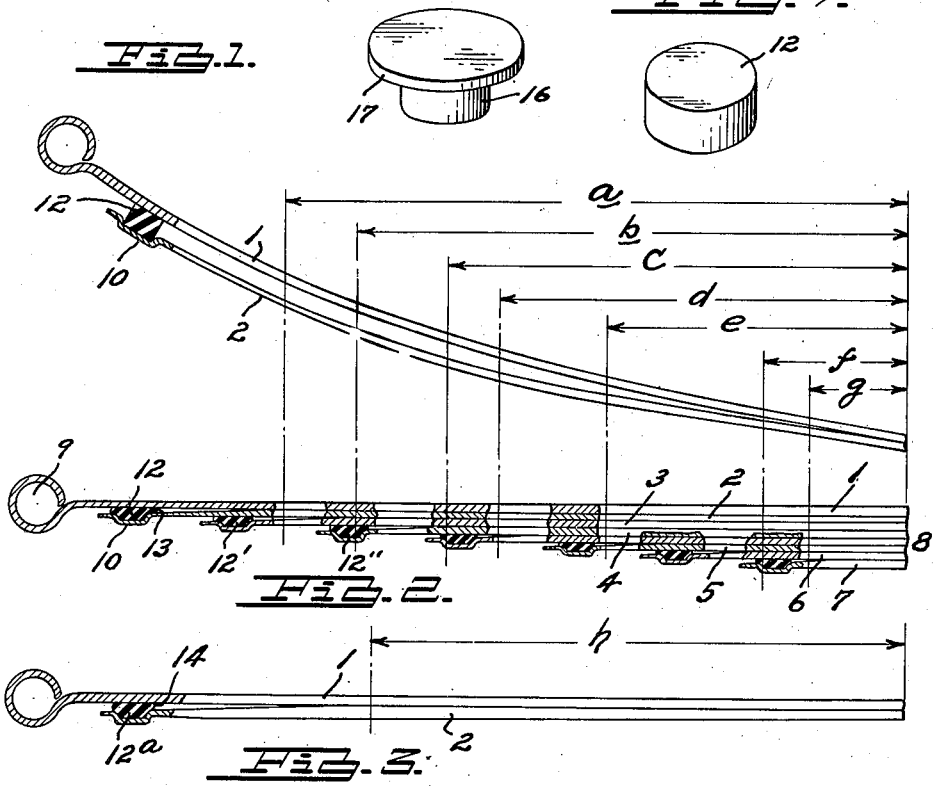
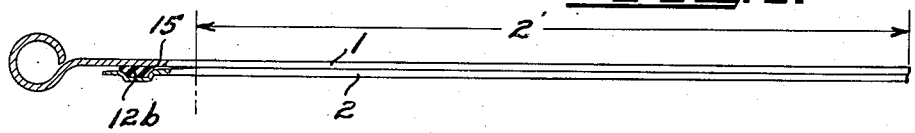
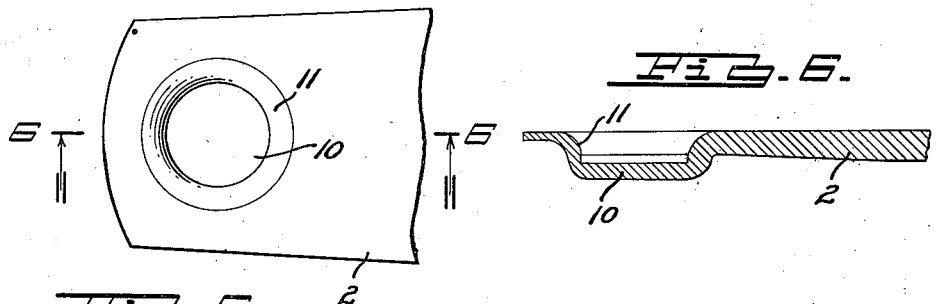
INVENTOR.
Harold T. Dow
BY
ATTORNEY.

Patented June 24, 1941

2,246,879

UNITED STATES PATENT OFFICE 2,246,879

VEHICLE SPRING

Harold T. Dow, Elma, N. Y., assignor to Spring Perch Company, Inc., a corporation of New York Application July 1, 1939, Serial No. 282,421

5 Claims. (Cl. 267—47)

This invention relates to vehicle springs of the multi-leaved elliptic type and the object of the invention is to provide a new and improved means and method of calibrating the spring to secure a predetermined dampening effect in order that the spring may have the required reaction under specific load.

The principal feature of the invention resides in the positioning of inserts between the leaves of a character to relieve high static pressure between contiguous leaves at their free ends to varying degree to thereby provide a certain dynamic frictional contact area between the leaves as the sole means for providing a predetermined dampening, the insert being of rubber as hereinafter defined to prevent friction at the insert.

It has heretofore been common to provide inserts between the leaves of springs of the character herein disclosed and also to provide rubber inserts but in my improved construction the inserts provide a peripheral and laterally unconfined flange of rubber between the leaves and by varying the height of the insert a greater or less thickness of rubber flange is provided to thereby determine the extent to which the ends of the leaves are separated when under load and by varying the length of the insert or thickness of flange between the leaves I have found that the dampening area (that is the area of the several leaves in surface contact), may be varied to provide a predetermined dampening factor.

With the rubber of such composition that it may flow or yield under variation in pressures applied to the springs friction between the insert carried by one leaf and the next contacting leaf is eliminated. By elimination of friction between the inserts and the leaves and by variation in the vertical height of the inserts or flanges the multi-leaved vehicle spring may be accurately calibrated with the desired dampening effect under a predetermined load.

These and other various features and objects of the invention are hereinafter more fully described and claimed and the structure illustrating my improved vehicle spring and the method of calibrating the same is shown in the accompanying drawing in which—

Fig. 1 is an illustration of the application of one form of insert between two leaves of a spring.

Fig. 2 shows a quarter elliptic spring with the several leaves and inserts therebetween under normal load.

Fig. 3 shows two leaves of the spring and illustrates the manner of decreasing the dampening area by the height of the insert.

Fig. 4 is a similar view with a less height of insert to increase the dampening area.

Fig. 5 is a plan view of a leaf end showing the recess for the insert.

Fig. 6 is a section therethrough on line 6—6 of Fig. 5.

Fig. 7 is a perspective view of the preferred form of the insert.

Fig. 8 is a perspective view of another desirable form of insert.

Vehicle springs of the multi-leaved elliptic type, as heretofore made, with or without inserts cannot be accurately calibrated as the frictional area when no inserts are used is the total area of the leaves in contact and therefore the variation in length of the leaves provided the sole means for determining the dampening area and when inserts were used they were all of the same height and the friction between the insert and the leaf supported thereon provided high pressure points with a resultantly high static friction.

In my improved spring, high pressure points between the leaves and the resultant high static friction has been eliminated and the dampening factor is determined by retaining a predetermined dynamic friction or braking action which is in relation to the amount of the high static pressure between contiguous leaves thereby producing a sensitive and smooth action under a specific load.

The manner of and means for calibrating multi-leaved vehicle spring of the elliptic type is to be understood from the following description and the drawing and it is firstly to be understood that by the term elliptic type as used in the specification and claims the spring may be of various forms either half elliptic or two full half elliptics joined at the terminal end of one fourth elliptic and in the drawing I have only illustrated the latter form it being readily understandable to those skilled in the art as to how the half elliptic or full elliptic spring should be constructed to secure a desired dampening effect under specific load.

In Fig. 2 I have shown the spring as being formed of leaves 1, 2, 3, 4, 5, 6 and 7 and the end 8 of the group would be the center line of a half elliptic spring which is to be secured in fixed relation to an axle, for instance, while the eyed end 9 of the leaf 1 is connected with the body of the vehicle as by means of the usual shackle not here shown. Each of the leaves, except the leaf 1 of the series, is formed with a depression 10 in its upper face near the end. This depression is preferably circular in form and the side walls extend outwardly on an angle as indicated at 11 and one form of insert is indicated generally at 12 in Fig. 7 is of rubber. It is desirable that the rubber insert be held in close tolerances to eliminate possibility of changing the condition of the spring action after such action has once been determined and it is also very desirable that the rubber be of such composition that it will tend to flow through the relative movement of the leaf in contact therewith rather than leaf should slide thereon which could only result in the introduction of an undeterminable factor of friction. Therefore the material of which the rubber inserts are formed should be held closely to the following specifications; viz: Black stock of a uniform hardness, the hardness at room temperature being 63 to 67 and at zero Fahrenheit 75 maximum on Shore durometer. The material should have a tensile strength of 3200 pounds per square inch, an elongation of 600 per cent, and a compression set test equal to 400 pounds pressure on the rubber section used in an oven at 158 degrees Fahrenheit for 22 hours, the dimension being taken ten minutes after removing from oven set test not to exceed 6 per cent of the dimension.

The inserts may differ in composition from the preferred composition above stated which has been found very practicable in use. The inserts shown in Fig. 7 are of solid cylindrical form and all of the same diameter but are made in different lengths from end to end. These inserts are introduced between successive leaves after the manner shown in Fig. 1 in which only the leaves 1 and 2 are shown. The leaves are spread apart as shown in full line and the insert 12 set into the recess 10 of the leaf 2 which in so doing spreads the leaves to near the center or point where the leaves may be bound together. Upon removal of the spreading tool the tendency of leaves to come to contact is opposed by the insert and this compresses the rubber 12 and forms a flange 13, shown in Fig. 2, which lies between the spring surfaces by the flow of the rubber over the rounded or angular portion 11 of the recess or seat. The insert between each of the leaves is likewise compressed to form a rubber flange between the leaves but the flange differs in thickness due to the different lengths of the insert. In the form shown in Fig. 2 which is the position of the leaves under load it will be noted that by reason of the thickness of flange the leaves are separated for a distance and providing a frictional area in contact or dampening area of the length $a$ of Fig. 2 but, if the flange 13 were of greater thickness, the length of the spring surfaces in contact would be less and with a less depth of flange of the rubber element 12 between the same two leaves the dampening area of the length $a$ would be increased.

The insert 12' in Fig. 2 is of a length to provide a slightly less thickness of rubber flange, in the spring here shown, which would provide a dampening area $b$ and the insert 12'' has a flange of greater thickness than that of 12' and the succeeding inserts between the leaves 3—4, 4—5, and 5—6 are shown as having a least thickness of flange and the dampening areas $c$, $d$, $e$, $f$ and $g$ are consecutively decreased due to the length of the leaves from the center line. It will be observed, however, that by variation of the thickness of the flange between the leaves and of the different lengths of the leaves that a varied dampening effect can be secured and thus the reaction of the spring or tendency to remain in vibration may be accurately determined for use under a specified load. Therefore, while the springs may all be formed of the same overall length and same number and length of leaves, the spring may be adapted for use with differing supported loads or body weight. Thus one standard spring may be calibrated for much or little freedom according to the desired effect by utilizing and variably positioning inserts of various lengths to thereby adjust the dampening area for certain load or for different reaction from deflection under specific load.

This variation in dampening area will be more readily understood in comparing leaves 1 and 2 of Fig. 2 having the insert 12 and flange 13 with the same leaves in Fig. 3 with an insert 12a of a length to provide a greater thickness of flange 14 than the flange 13 of Fig. 2. In Fig. 2 the dampening area is indicated at $a$ but the dampening area $h$, Fig. 3, is materially less.

If a greater length of dampening area with the same width of leaves be required for any particular installation an insert 12b as shown in Fig. 4 with the flange 15 of less thickness than the flange 13 or 14 of Fig. 2 may be used and dampening area 2' would be of greater length than the area $a$ of Fig. 2. It will therefore be seen that with the spring leaves of the same length and of the same width, the spring may be calibrated for different reaction from deflection through variation of the area of contact between the leaves. With several leaves of differing lengths, as is the usual practice, the spring may be calibrated with extreme accuracy to secure the desired reaction from deflection under specific loads.

It will further be observed that the area of contact between the various leaves is secured by varying thickness of flange between the leaves and that due to the rubber composition used, there is no frictional contact of the leaf with the insert as the rubber flange will yield or flow under spring deflection without slipping. The unpredictable and inconsistent factor of friction between the leaf and inserts such as have heretofore been used is therefore eliminated and the spring is calibrated purely through the variation in area of the various leaves in contact and this is the sole factor to be considered irrespective of the number of leaves or the length of leaves both of which may be varied depending upon the load.

While I have described the inserts as being of uniform shape and the flange produced by the varying lengths it is possible to use an insert with a formed flange, as is suggested in Fig. 8, the body 16 of which is of a cylindrical form for insertion in the recess therefor and the formed flange 17 of greater diameter is located between the leaves. By forming the inserts as shown in Fig. 8 with varying thickness of flange substantially the same result may be obtained as with the inserts shown in Fig. 7.

It is also obvious that the diameter of the body of the insert may be varied, it being desirable to increase the diameter when used with spring leaves of greater width and thickness for the heavier loads and decrease the diameter for use with the leaves of less width and/or thickness for lighter loads. The principle involved in the utilization of the inserts in either of the forms shown in Figs. 7 or 8 is not changed with change in size of the body of the insert or thickness of integral flange of the form shown in Fig. 8 nor thickness of flange produced by pressure between the spring leaves with the form shown in Fig. 7. It is also pointed out that, while in the drawing I have only shown a quarter elliptic spring adapted for seating at the large end on an axle for connection at the opposite end to the shackle of the vehicle body, such character of installation may be reversed and the large end attached to the body frame or load supporting element with the free end attached to a support or to the free end of the similar spring element.

It is therefore to be seen that a spring constructed and calibrated in the manner herein described may be made in various lengths overall and varied width of leaves for various characters of installation.

Having thus fully described my invention, its utility and mode of operation, what I claim and desire to secure by Letters Patent of the United States is—

1. A leaf spring assembly comprising a plurality of leaves, one leaf of each successive pair having a depression in the surface thereof contacting the other, said depressions being of equal depth and providing a cup, the periphery of which is outcurved to form a continuous unbroken surface from the surface of the leaf to the inner surface of the cup and a bearing element in each of the depressions, the said elements varying in length to spread successive pairs of leaves at their ends to a varying degree to thereby vary the area of frictional contact between the successive leaves and thereby provide a leaf spring having a predetermined dampening area.

2. A leaf spring assembly comprising a plurality of leaves, one leaf of each successive pair of leaves having a depression in the surface thereof contacting the other, said depressions being of equal depth and providing a cup, the periphery of which is outcurved to form a continuous unbroken surface from the surface of the leaf to the inner surface of the cup, a bearing element in each of the depressions formed of yieldable rubber of a length greater than the depth of the depression, the said elements varying in length to thereby spread the successive pairs of leaves at their ends to varying degree and provide a laterally unconfined area of rubber between the successive pairs of leaves.

3. A leaf spring assembly comprising a plurality of leaves, one leaf of each successive pair of leaves having a cup formed therein adjacent the end thereof in the surface facing the other, the open end of each cup being of greater diameter than the diameter of the cup and providing an unbroken curved surface at the mouth of the cup, a bearing element in each of the depressions formed of yieldable rubber of a length greater than the depth of the depression, said curved surface between the cup and surface of the leaf permitting the rubber to "flow" under pressure between adjacent leaves to provide an unconfined flange of rubber between the opposed surfaces, the said flanges varying in thickness to thereby spread the leaves of successive pairs at their ends to a varying degree and thus provide a dampening area determined by friction between the contacting surfaces of the leaves.

4. A leaf spring assembly comprising a plurality of spring leaves, one leaf of each successive pair having a depression forming a cup adjacent the end thereof in the surface facing the other, said cup being of greater diameter at the surface of the leaf than the diameter of the body therebelow, a rubber bearing element positioned in the depression in each of the leaves to prevent relative lateral displacement, said bearing elements varying in length and all of the elements being greater in length than the depth of the respective depression, and having a portion between the leaves of greater area in cross section than the cross sectional area of the element in the depression thereby providing a laterally yieldable flange of rubber between the leaves whereby the dampening area of the assembled leaves is determined by the frictional component between the contacting leaf surfaces.

5. A leaf spring assembly comprising a plurality of leaves, the surface of each leaf facing the other of a series having a depression forming a cup adjacent the end thereof, the cross sectional area of the body of the cup being less than the cross section area of the opening in the leaf in which it is formed, and a rubber insert having a body portion fitting the cup, and a formed flange of greater area than the opening of the cup and spacing adjacent leaves a distance apart determined by the thickness of the flange, said flange between the leaves being laterally yieldable under flexing of the leaves tending to eliminate a frictional component, the outer face of the flange and surface of the leaf in contact therewith.

HAROLD T. DOW.